United States Patent [19]
Ostlinning et al.

[11] Patent Number: 4,794,162
[45] Date of Patent: Dec. 27, 1988

[54] PREPARATION OF HIGH MOLECULAR WEIGHT POLYARYLENE SULFIDE WITH MIXING OF POLYARYLENE SULFIDE WITH SULFUR

[75] Inventors: Edgar Ostlinning, Duesseldorf; Karl-Herbert Fritsch, Bergisch-Gladbach, both of Fed. Rep. of Germany

[73] Assignee: Bayer Aktiengesellschaft, Leverkusen, Fed. Rep. of Germany

[21] Appl. No.: 832,011

[22] Filed: Feb. 24, 1986

[30] Foreign Application Priority Data

Mar. 6, 1985 [DE] Fed. Rep. of Germany ....... 3507827

[51] Int. Cl.$^4$ .............................................. C08G 23/00
[52] U.S. Cl. ..................................... 528/388; 525/537
[58] Field of Search ........................ 528/388; 525/537

[56] References Cited

U.S. PATENT DOCUMENTS

| | | | |
|---|---|---|---|
| 3,607,843 | 9/1971 | Vidaurri | 528/388 |
| 3,699,087 | 10/1972 | Wood et al. | 528/388 |
| 3,725,362 | 4/1973 | Walker | 528/388 |
| 4,046,749 | 6/1977 | Hawkins | 260/79 |
| 4,286,018 | 8/1981 | Asakura et al. | 528/388 |

OTHER PUBLICATIONS

Patent Abstracts of Japan, vol. 6, No. 57–165, Apr. 1982.

Primary Examiner—Harold D. Anderson
Attorney, Agent, or Firm—Connolly and Hutz

[57] ABSTRACT

This invention relates to a process for the preparation of high molecular weight polyarylene sulphides from low molecular weight polyarylene sulphides by a reaction with elementary sulphur.

6 Claims, No Drawings

PREPARATION OF HIGH MOLECULAR WEIGHT POLYARYLENE SULFIDE WITH MIXING OF POLYARYLENE SULFIDE WITH SULFUR

This invention relates to a process for the preparation of high molecular weight polyarylene sulphides from low molecular weight polyarylene sulphides by a reaction with elementary sulphur.

Polyarylene sulphides and their preparation are known (e.g., U.S. Pat. Nos. 2,513,188, 3,117,620, 3,354,129, 3,524,835, 3,790,536, 3,839,301, 4,048,259, 4,038,260, 4,038,261, 4,038,262, 4,056,515, 4,060,520, 4,063,114, 4,116,947 and 4,282,347, DE-AS 2 453 485 and 2 453 749, and DE-OS 2 623 362, 2 623 363, 2 633 333, 2 930 797, 2 930 710, 3 019 732, 3 030 488, 3 215 259, 3 243 189 and 3 241 514).

It is further known that low molecular weight polyarylene sulphides, which have only limited possibilities of being processed, can be built up into high molecular weight products by a so-called curing step (e.g. U.S. Pat. Nos. 3,562,199, 3,717,620, 3,737,411, 3,793,256, 4,321,358, 4,370,471 and 4,383,080).

The substances used for the curing step in this process may be, for example, oxygen, ozone or quinones, etc.

It is also known to use other additives in the curing process, e.g. metals (see U.S. Pat. No. 3,451,873), sulphuric acid or polysulphonic acids or their halides (see e.g. U.S. Pat. No. 3,839,301).

Sulphur is also known as an agent for synthesizing high molecular weight polyarylene sulphides (see, for example, U.S. Pat. Nos. 3,699,087 and 3,725,362 and JP-P 165 of 05.01.1982). In order to obtain an improved product, however, it is necessary either to add a metal oxide (ZnO, ZrO$_2$) as an auxiliary agent or to use S in large quantities in terms of its percentage by weight.

It has now been found that high molecular weight polyarylene sulphides may be prepared from low molecular weight polyarylene sulphides by curing with only a small quantity of elementary sulphur if the sulphur is added to the polyarylene sulphides by a suitable method and the reaction with sulphur is carried out solvent-free.

The present invention thus relates to a process for the preparation of high molecular weight polyarylene sulphides from low molecular weight, optionally branched chain polyarylene sulphides, using the following components:

a. 50-100 mol-% of dihalogenated aromatic compounds corresponding to the formula

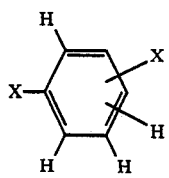

(I)

and 0-50 mol-% of dihalogenated aromatic compounds corresponding to the formula

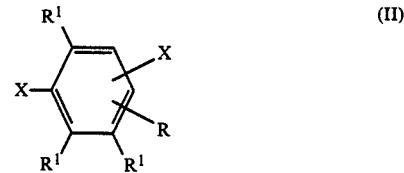

wherein
X stands for halogen such as chlorine or bromine in the meta- or para-position to each other and
$R^1$, which may be identical or different, may represent hydrogen, $C_1$-$C_4$-alkyl, $C_5$-$C_{10}$-cycloalkyl, $C_6$-$C_{10}$-aryl, $C_7$-$C_{14}$-alkylaryl or $C_7$-$C_{14}$-arylalkyl or two groups represented by $R^1$ in the ortho-position to each other may be linked together to form an aromatic or heterocyclic ring containing up to three hetero atoms such as N, O or S, and one of the groups $R^1$ is invariably different from hydrogen, and b. 0-0.5 mol-%, preferably 0.0-0.1 mol-%, based on the sum of dihalogenated aromatic compounds corresponding to formulae I and II, of a trihalogenated or tetrahalogenated aromatic compound corresponding to the formula $$ArX_n \qquad \text{(III)}$$

wherein
Ar stands for an aromatic or heterocyclic group,
X for halogen such as chlorine or bromine and
n for the number 3 or 4, and c. alkali metal sulphides, preferably sodium or potassium sulphide or mixtures thereof, preferably in the form of their hydrates or aqueous mixtures, optionally together with alkali metal hydroxides such as sodium or potassium hydroxide; the molar ratio of which components, (a+b): c, may lie within the range of from 0.75:1 to 1.05:1, preferably from 0.90:1 to 1.00:1, in d. an organic solvent, optionally with the addition of
e. catalysts or cosolvents,
and
f. elementary sulphur in quantities of from 0.1 to 1.5% by weight, preferably from 0.15 to 1.05% by weight, based on the polyarylene sulphide, characterised in that the sulphur is applied in a very finely divided form and the reaction is carried out in the melt at temperatures of from 300° C. to 390° C., preferably from 340° C. to 370° C.

Preparation of the polyarylene sulphides may be carried out by basically known processes.

The catalysts may be those conventionally used for this purpose, e.g. alkali metal fluorides, alkali metal phosphates or alkali metal carboxylates, and are added in the usual quantities, i.e. from 0.02 to 1.0 mol of catalyst is used per mol of alkali metal sulphide.

The cosolvents used may be, for example, N,N-dialkylcarboxylic acid amides of $C_1$-$C_8$-aliphatic or $C_6$-$C_{12}$-aromatic carboxylic acids added in a quantity of 0.02 to 1.0 mol, based on 1 mol of alkali metal sulphide.

$R^1$ in formula II preferably stands for hydrogen, $C_1$-$C_{20}$-alkyl, $C_5$-$C_{20}$-cycloalkyl, $C_6$-$C_{24}$-aryl, $C_7$-$C_{24}$-alkylaryl or $C_7$-$C_{24}$-aralkyl. Furthermore, two groups represented by $R^1$ in the ortho-position to each other may form a condensed aromatic ring having a total of 6 carbon atoms or a condensed heterocyclic ring having 5 or 6 ring atoms and 1-3 hetero atoms such as N, O or S.

Ar preferably stands for an aromatic group having 6-24 carbon atoms or a hecterocyclic group having 6-24 ring atoms and most preferably stands for an aromatic group having 6-10 carbon atoms or a heterocyclic group with up to 3 hetero atoms such as N, S or O. The alkali metal sulphides may be put into the process in the usual quantities and in the usual form. For example, lithium, sodium and potassium sulphide are suitable but sodium and potassium sulphide are preferred. Alkali metal sulphides which have been regenerated from hydrogen sulphides by means of alkali metal hydroxides such as LiOH, NaOH or KOH may be used. Mixtures of the sulphides and of the hydroxides may be used in all cases.

Aromatic meta- and para-dihalogen compounds corresponding to formula (I) or (II) may be used. In that case, the ratio of meta- to para-dihalogen compound may be up to 30:70.

The process may be carried out under a slight excess pressure of up to 15 bar.

The following are examples of dihalogenated aromatic compounds of formula (I) suitable for the purpose of the invention: p-Dibromobenzene, 1-chloro-4-bromobenzene, 1,3-dichlorobenzene, 1,3-dibromobenzene, 1-chloro-3-bromobenzene, and 1-chloro-3-bromobenzene. They may be used separately or as mixtures with one another. It is particularly preferred to use 1,4-dichlorobenzene and/or 1,4-dibromobenzene.

The following are examples of suitable dihalogenated aromatic compounds corresponding to formula (II): 2,5-Dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene, and 1-cyclohexyl-3,5-dichlorobenzene. Each of these may be used alone or together with others exemplified in this list.

The following are examples of suitable tri- and tetrahalogenated aromatic compounds corresponding to formula (III): 1,2,3-Trichlorobenzene, 1,2,4-trichlorobenzene, 1,2,4-tribromobenzene, 1,3,5-trichloro-2,4,5-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl, and 1,3,5-trichlorotriazine.

Examples of suitable organic solvents include alkyl lactams such as N-methyl-pyrrolidone, N-ethyl-pyrrolidone, N-isopropyl-pyrrolidone, N-methyl-piperidone, N-methylcaprolactam or N,N'-dimethyl-piperazinone as well as other polar organic solvents, such as 1-methyl-1-oxophospholan. The reactants should be at least partially soluble in these solvents. The boiling point of the solvents is generally above 200° C.

The reaction time may be up to 24 hours and is preferably 2 to 18 hours.

The reaction is generally carried out at atmospheric pressure although the application of an excess pressure of 0.1 bar to 15 bar may be advantageous in special cases.

For preparing the polyarylene sulphide, all the components of the reaction may be added together in any sequence and the reaction mixture may then be heated, e.g. to a temperature of from 160° C. to 270° C., preferably from 170° C. to 250° C. The reaction may therefore be carried out as a one-shot reaction. The water which distils off azeotropically with the halogenated aromatic compound may be removed during the stage of heating up and in the course of the reaction, for example, by means of a water separator. Any water still present may thus be removed at any stage throughout the reaction.

The components of the reaction could equally well be dehydrated one after another or they could be added continuously during the stage of dehydration.

Working up of the reaction mixture and isolation of the polyarylene sulphide may be carried out by known methods.

The polyarylene sulphide may be separated from the reaction solution by known methods such as filtration or centrifuging, either directly or, for example, after the addition of water and/or dilute acids. The polyarylene sulphide is generally washed with water after it has been separated, but washing or extraction with other liquids may also be carried out in addition or subsequently.

The polyarylene sulphide may also be isolated, for example, by removal of the solvent by distillation followed by washing as described above. The polyarylene sulphides may contain SH groups.

The polyarylene sulphides obtained as described above are then treated with elementary sulphur. For this purpose, the desired quantity of anhydrous sulphur may be added to the polyarylene sulphides in a mixer or the sulphur may be added as a solution in sulphur solvents which are distilled off before the start of the reaction. Furthermore, the sulphur may be added, for example, in the form of a suspension in suitable solvents, freshly precipitated or colloidal sulphur being optionally used for this purpose.

As an alternative method, the sulphur may be applied by sublimation on the polyarylene sulphide.

The sulphur may be introduced by one of the above mentioned methods into a polyarylene sulphide which has already been melted.

Any commercial forms of elementary sulphur are suitable for the purpose of the invention, e.g. sulphur in molten or powder form in the $\alpha$, $\beta$ or $\lambda$ modifications of sulphur. Pure or highly purified sulphur qualities are particularly suitable.

The most suitable form of sulphur is flowers of sulphur obtained by double sublimation of purified sulphur.

Sulphur solvents which may be used for the preparation of mixtures of polyarylene sulphides and sulphur include acetone, carbon disulphide, toluene, etc.

The temperatures employed in the reaction carried out after the preparation of the mixtures of polyarylene sulphides and sulphur are in the region of 300° C. to 390° C., preferably 340° C. to 370° C. The reaction may take up to several hours, preferably 0.05 to 12 hours. The reaction is advantageously carried out under conditions of mixing in an inert gas atmosphere (e.g. $N_2$, $CO_2$, Ar, etc.).

Simple stirrer apparatus, kneaders or mixing screws may be used to ensure thorough mixing.

The melt flow rate of polyarylene sulphides is generally determined according to ASTM 1298-79 at 316° C. using a 5 kg weight and given in g/10 min.

If the melt flow is high, however, this method of measurement may give rise to difficulties due to the high outflow rate of the polymer melt.

The flow of the polymer melt was therefore determined in terms of the melt viscosity $\eta m$ (in Pa.s) at 306° C. in dependence upon the shearing stress (in Pa.s), using an Instron rotation viscosimeter.

This method can be used to determine the melt viscosity over a very wide range of from $10^{-1}$ to $10^7$. In the Instron rheometer, the polymer is melted between a fixed plate and a rotatable cone and the torque of the cone is determined. The melt viscosity can be calculated in dependence upon the shearing stress from the torque, the angular velocity and the constants of the apparatus. Rheometer Model 32500 of Instron was used; diameter of the cone and plate: 2 cm.

Value given is the melt viscosity determined at a shearing stress of $\tau = 10^2$ Pa.

Immediately after their isolation from the reaction mixture, the polyarylene sulphides may generally have melt viscosities in the region of 0.1 to 50 Pa.s, preferably from 0.15 to 20 Pa.s. After the reaction with sulphur, the polyarylene sulphides according to the invention have melt viscosities of from 400 to 100,000 Pa.s, preferably from 1000 to 50,000 Pa.s. They may be worked up directly into films, moulded bodies or fibres by extrusion, extrusion blow moulding, injection moulding or other conventional processing techniques. These polyarylene sulphides are particularly suitable for coating moulded articles.

These articles may be of the kind commonly used, such as parts of motor vehicles, fittings, electrical parts such as switches or electronic panels, chemically resistant and weather resistant parts and apparatus such as pump housings and pump impellers, dishes for caustic baths, gasket rings, parts of office machinery and telecommunication apparatus as well as domestic equipment, valves, ball bearing parts, etc.

EXAMPLE 1 (COMPARISON EXAMPLE)

Comparison (a) Preparation of polyphenylene sulphide according to U.S. Pat. No. 3,354,119

129 g of sodium sulphide hydrate ($\hat{=}1$ mol $Na_2S$) and 300 g of N-methylpyrrolidone were brought together in an autoclave equipped with stirrer. The mixture was flushed with nitrogen and slowly heated to 202° C. A total of 19 ml of water distils off in the process (corresponding to a residual water content of 1.78 mol, based on sodium sulphide). The reaction mixture was then cooled to about 160° C. and 147 g of p-dichlorobenzene ($\hat{=}1$ mol) in about 50 g of methylpyrrolidone were added. The reaction mixture was heated to 245° C. in the course of 30 minutes under a preliminary nitrogen pressure of 2.5 bar and this temperature was maintained for 3 hours. The final pressure obtained was 14.5 bar. A grey solid was isolated after cooling to room temperature. This solid was subsequently washed with water and dried under a vacuum at 80° C., and 100.3 g ($\hat{=}93\%$) of poly-p-phenylene sulpide were obtained. This product was light brown in colour and had a melt viscosity of $\eta m = 4.5$ Pa.s (at $\tau = 10^2$ Pa).

(b) Curing of PPS according to U.S. Pat. No. 3,699,087, see Example 1, column 6/7.

EXAMPLE 2

1110 g of 1-Methyl-1-oxo-phospholan, 305.2 g of sodium sulphide hydrate ($\hat{=}2.32$ mol), and 341.1 g of 1,4-dichlorobenzene ($\hat{=}2.32$ mol) were introduced under nitrogen into a 2 l, three-necked flask equipped with thermometer, stirrer and column with distillate separator. The reaction mixture was slowly heated to boiling. Water was removed from the azeotropic distillate of water and p-dichlorobenzene, and the p-dichlorobenzene was returned to the reaction vessel. No more water can be detected either in the distillate or in the sump after two hours. Heating under reflux is continued for a further 9 hours and the product is then isolated in the usual manner. 230.9 g of a white polyarylene sulphide are obtained ($\hat{=}92.2\%$ yield, based on $Na_2S$; melt viscosity $\eta m = 3.9$ Pa.s (at $\tau = 10^2$ Pa.)).

EXAMPLE 3

Same as Example 2 but using 1110 g of N-methylcaprolactam as solvent. 237.2 g of white polyarylene sulphide were obtained ($\hat{=}94.5\%$ yield, based on $Na_2S$; melt viscosity $\eta m = 13.5$ Pa.s (at $\tau = 10^2$ Pa.)).

EXAMPLE 4

Same as Example 2 but using 1110 g of N,N'-dimethyl piperazinone as solvent. 227.9 g of polyarylene sulphide were obtained ($\hat{=}90.8\%$ yield based on $Na_2S$; melt viscosity $\eta m = 5.2$ Pa.s (at $\tau = 10^2$ Pa.s)).

EXAMPLES 5–12

The given quantity of flowers of sulphur was added to 10 g of polyarylene sulphide and the components were reacted together with stirring under a nitrogen atmosphere (Table 1).

TABLE 1

| Example | Polyarylene sulphide from Example | % by weight S | Temperature (°C.) | Time (h) | $\eta m$ |
|---|---|---|---|---|---|
| 5 | 1 | 0.5 | 360 | 1 | 520 |
| 6 | 2 | 0.5 | 360 | 1 | 750 |
| 7 | 3 | 0.5 | 360 | 1 | 1180 |
| 8 | 4 | 0.5 | 360 | 1 | 810 |
| 9 | 1 | 1.0 | 350 | 2 | 420 |
| 10 | 2 | 1.0 | 350 | 2 | 930 |
| 11 | 3 | 1.0 | 350 | 2 | 1070 |
| 12 | 4 | 1.0 | 350 | 2 | 790 |

EXAMPLES 13–16

10 g of Polyarylene sulphide were introduced into a reaction tube and sulphur vapour was applied to it by sublimation with the aid of a stream of nitrogen. The product was then melted with stirring under a nitrogen atmosphere (Table 2).

TABLE 2

| Example | Polyarylene sulphide from Example | % by weight S | Temperature (°C.) | Time (h) | $\eta m$ |
|---|---|---|---|---|---|
| 13 | 1 | 0.5 | 360 | 1 | 830 |
| 14 | 2 | 0.5 | 360 | 1 | 930 |
| 15 | 3 | 0.5 | 360 | 1 | 1410 |
| 16 | 4 | 0.5 | 360 | 1 | 1020 |

EXAMPLES 17–20

10 g of Polyarylene sulphide were stirred together with a solution of acetone containing 0.5% by weight of S, based on the polyarylene sulphide, and the solvent was evaporated off. The mixture was then stirred under a nitrogen atmosphere for one hour at 360° C. (Table 3).

TABLE 3

| Example | Polyarylene sulphide from Example | ηm |
| --- | --- | --- |
| 17 | 1 | 770 |
| 18 | 2 | 920 |
| 19 | 3 | 1320 |
| 20 | 4 | 790 |

We claim:
1. A process for the preparation of high molecular weight polyarylene sulphide which comprises reacting:
  (a) 50–100 mol-% of at least one dihalogenated aromatic compound corresponding to the formula

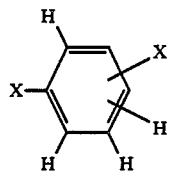

and 50–0 mol-% of at least one dihalogenated aromatic compound corresponding to the formula

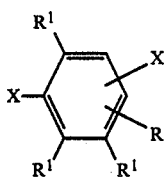

wherein
  X stands for halogen in the meta- or para-position to one another and
  each $R^1$ is identical or different and each independently stands for hydrogen, $C_1$–$C_4$-alkyl, $C_5$–$C_{10}$-cycloalkyl, $C_6$–$C_{10}$-aryl, $C_7$–$C_{14}$-alkylaryl or $C_7$–$C_{14}$-arylalkyl or two $R^1$ groups in the ortho-position to one another linked together to form an aromatic or heterocyclic ring containing up to 3 hetero atoms, and one of $R^1$ is different from hydrogen, and
  (b) 0–0.5 mol-%, based on the sum of dihalogenated aromatic compounds corresponding to formula I and II, of a tri- or tetra-halogenated aromatic compound corresponding to the formula $$ArX_n, \qquad (III)$$

wherein
  Ar stands for an aromatic or heterocyclic group,
  X stands for a halogen and
  n represents the number 3 or 4, and
  (c) alkali metal sulphide,
wherein
  components a, b and c are reacted in such proportions that the molar ratio (a+b): c is within the range of from 0.75:1 to 1.05:1, and the reaction is carried out in
  (d) an organic solvent to produce a first polyarylene sulphide,
  and then increasing the molecular weight of said first polyarylene sulphide by mixing the first polyarylene sulphide with a material consisting essentially of elementary sulphur, in the form of flowers of sulphur or in a solution, in quantities of from 0.1 to 1.5% by weight, based on the first polyarylene sulphide, in the melt at temperatures of from 300° C. to 390° C. and under an inert gas atmosphere.
2. A process according to claim 1, characterised in that the amount of sulphur is from 0.15 to 1.05% by weight, based on the polyarylene sulphide.
3. A process according to claim 1 characterised in that the sulphur is in the form of a solution and the solvent is evaporated from the mixture.
4. A process according to claim 1, characterised in that the sulphur is supplied to the mixture by sublimation.
5. A process according to claim 1, characterised in that the temperature is from 340° C. to 370° C.
6. A process according to claim 1, characterised in that sulphur is in suspension form.

UNITED STATES PATENT AND TRADEMARK OFFICE
CERTIFICATE OF CORRECTION

PATENT NO. : 4,794,162

DATED : December 27, 1988

INVENTOR(S) : Edgar Ostlinning; Karl-Herbert Fritsch

It is certified that error appears in the above—identified patent and that said Letters Patent is hereby corrected as shown below:

Column 4, line 67, "ASTM 1298-79" should read -- ASTM 1238-79 --

Column 5, line 43, "3,354,119" should read -- 3,354,129 --

Signed and Sealed this

Seventeenth Day of October, 1989

Attest:

DONALD J. QUIGG

Attesting Officer

Commissioner of Patents and Trademarks